United States Patent [19]

Wested

[11] 4,244,439

[45] Jan. 13, 1981

[54] SOUND-ABSORBING STRUCTURE

[75] Inventor: Jens Wested, Herlev, Denmark

[73] Assignee: Elektronikcentralen, Hersholm, Denmark

[21] Appl. No.: 956,274

[22] Filed: Oct. 31, 1978

[30] Foreign Application Priority Data

Nov. 10, 1977 [DK] Denmark ............................ 4984/77
Aug. 4, 1978 [DK] Denmark ............................ 3452/78

[51] Int. Cl.$^{3}$ ......................... B64F 1/26; G10K 11/00

[52] U.S. Cl. ................................ 181/210; 181/286; 181/288; 181/292

[58] Field of Search ............... 181/210, 224, 286, 288, 181/292, 294, 284, 285, 293; 52/145, 320; 428/116–118

[56] References Cited

U.S. PATENT DOCUMENTS

| | | | |
|---|---|---|---|
| 1,825,770 | 10/1931 | Barnett | 181/293 |
| 1,972,563 | 9/1934 | Irvin | 181/292 |
| 2,335,728 | 11/1943 | Benecke | 181/285 |
| 3,087,565 | 4/1963 | Kerwin, Jr. | 181/208 |
| 3,087,567 | 4/1963 | Kurtze | 181/208 |
| 3,498,405 | 3/1970 | Charpentier | 181/291 |
| 3,593,819 | 7/1971 | Giraudeau | 181/288 |
| 3,640,357 | 2/1972 | Kitching et al. | 181/292 |
| 3,783,968 | 1/1974 | Derry | 181/210 |
| 3,819,009 | 6/1974 | Motsinger | 181/292 |
| 3,822,762 | 7/1974 | Crispin et al. | 181/292 |
| 3,866,001 | 2/1975 | Kleinschmidt et al. | 181/285 |
| 3,895,152 | 7/1975 | Carlson et al. | 428/116 |
| 3,972,383 | 8/1976 | Green | 181/292 |
| 4,015,682 | 4/1977 | Keller | 181/210 |
| 4,091,892 | 5/1978 | Hehmann et al. | 181/288 |
| 4,097,633 | 6/1978 | Focht | 52/145 |
| 4,106,587 | 8/1978 | Nash et al. | 181/293 |
| 4,138,947 | 2/1979 | Pickett | 181/210 |
| 4,158,401 | 6/1979 | Matsumoto et al. | 181/292 |

FOREIGN PATENT DOCUMENTS

| | | |
|---|---|---|
| 965611 | 8/1964 | United Kingdom . |
| 1020421 | 2/1966 | United Kingdom . |

*Primary Examiner*—L. T. Hix
*Assistant Examiner*—Benjamin R. Fuller
*Attorney, Agent, or Firm*—LeBlanc, Nolan, Shur & Nies

[57] ABSTRACT

A sound-absorbing structure comprising a plurality of linear and parallel grooves in the surface of the structure and ribs between the grooves. The structure is employed to damp, in a semi-space which is delimited by a substantially plane surface, e.g. a ground surface, a sound field propagating essentially in parallel with said surface. The sound field originates in for instance traffic on a motorway or an airport. The grooves of the structure are arranged in such manner, that a sound attenuation is obtained, in terms of the direction of propagation of the sound field, behind the structure by means of an acoustic coupling between adjoining grooves at the sound frequencies to be damped. The surface of the sound-absorbing structure is situated substantially in the surface delimiting the above mentioned semi-space. The cross-section of the structure has an outline similar to a square wave or a sine curve. The structure may include two or more groove systems each having the grooves spaced differently or each having varying groove-depths or both measures in combination, thus making it possible to damp a broader sound frequency range.

15 Claims, 13 Drawing Figures

SOUND-ABSORBING STRUCTURE

Figure 1:
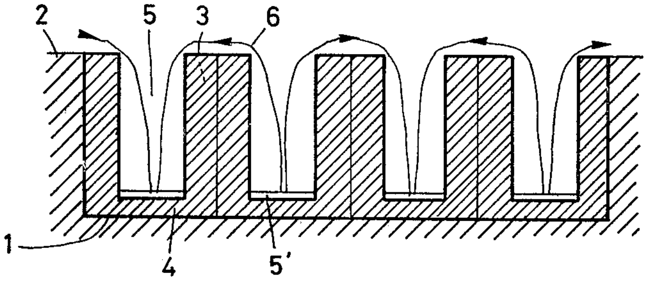

The present invention relates to a sound-absorbing structure having, arranged in a surface, a plurality of linear and parallel grooves and ribs between the grooves for damping a sound field, which in a direction normal to said surface gives rise to systems of stationary oscillations in said grooves.

On airports and on motorways a very heavy noise is frequently produced which noise has a very trying effect in the immediate surroundings of these installations. It is known that earth berms provided along such installations limit the noise nuisance appreciably, but earth berms are partly expensive, partly unwanted from a landscape architectural point of view, and now and then directly disturbing to, for instance to the approach to an airport.

U.S. Pat. No. 3,783,968 describes a sound barrier in the shape of a panel comprising elongated triangular prisms, which attenuate substantially orthogonally to the panel incident sound, in which the attenuation mainly is based on an inverse horn effect with impedance match, on vigorous eddies at the horn throat and possibly further on damping material placed in the prisms situated between said horns. It is true that panels of this kind can be manufactured partly transparent but still they present undesirable obstacles to the view and to possible traffic across said panels. In addition they are expensive.

Further, it is known that Helmholtz resonators built into a wall have a damping effect, and from the British Pat. Nos. 965,611 and 1,020,421 for instance one knows linear Helmholtz resonators which are adapted for placement in walls or partitions in order to reduce the transmission of sound through the particular walls and to reduce the reverberation of an adjacent room. As is known, Helmholtz resonators have a damping effect, because a sound field substantially orthogonal to the wall induce or provoke a system of stationary fluctuations in the interior of the resonator, which is not loss-free, and this results in energy being tapped from the sound field, which is consequently damped.

It is an object of the present invention to provide a damping structure of the above mentioned kind, which does not protrude into the sound field to be damped and as a result leave the view or visibilily free and even makes it possible to cross it too without hindrance, which in addition is less expensive than the known ones and which is highly effectively damping in relation to the required space.

According to the invention this is achieved by the creation of an acoustic coupling between adjacent grooves at the frequencies to be damped and by the surface of the sound-absorbing structure being substantially parallel with the direction of propagation of the sound to be damped.

By means of these measures it is achieved that the coupling of the damping structure to the sound field propagating parallelly with said structure becomes good in spite of the fact that no material protrudes into the sound field situated above the structure. Consequently the sound-absorbing structure according to the present invention gains an appearance like a flat mat, which may be put on or may be settled in the surface, along which the sound waves pass.

The present invention is fundamentally as well as in its origin based on an analogy between the propagation of electromagnetic waves and acoustic waves. Even if a full analogy between those two kinds of waves does not exist it has still been possible to prove the validity of the formulas for the propagation of electromagnetic waves employed for the acoustic field too, to compute the coupling between the sound field and the system of stationary sound fluctuations in the structure according to the present invention. Among this a basic field theory has been employed, whereas the results are most easily expressed in terms from the theory on electric circuits. It is inter alia recognized that the entire sound field phenomenon for a periodical structure of infinite extension has the same character as the phenomenon which in the case of the propagation of electromagnetic waves is called "slow waves", and it has been proved that the wave propagation near the surface of the structure may be at least 2.5 times slower than the normally occurring propagation.

Thus the formulas show a high sound attenuation per meter of the width of the structure and an increasing damping as the frequency of the sound waves increases towards a cut-off frequency in a similar manner as is the case by the propagation of electromagnetic waves in a wave guide, however, the frequencies are imagined to be inversed relative to the above mentioned cut-off frequency. Above this cut-off frequency a reflecting band-rejection range occurs, which range is succeded by a new absorbing bandpass range, etc. Because the structrue is of finite extension the band-rejecting ranges are not ideally damping. As the damping effect of the structure is thus at its maximum in a frequency range just beneath the cut-off frequency this frequency should be placed a little bit above the frequency range to be attenuated. By an acoustical coupling between two adjoining grooves the main component of the acoustic field near the cut-off frequency may be interpreted as a stationary oscillation between the bottom of each of said two grooves. If the sign of the phase is oriented upwards positive at the bottom of two adjoining grooves it will be appreciated that the oscillations near the cut-off frequency have the opposite phase in each pair of adjoining grooves.

In an embodiment of the invention the grooves are filled with air and their bottoms or walls or both are sound-absorbing and their apertures are covered by a film, preferably a foil of plastics material. This embodiment of the invention is simple to provide and therefore cheap in manufacture.

In a modified embodiment of a damping structure according to the invention the grooves contain sound-absorbing material at the bottom and the side walls of the grooves being sound reflecting without loss. Then the structure can be built in such manner that the grooves become non-contaminable. It will be understood that the fundamental oscillation of the system of oscillations created by means of the acoustic coupling has an antinode, which is situated up in the sound field generating the system of oscillations, but a large part of the length of this system of oscillations will get an arrangement, which is orthogonal to the direction of propagation of the sound to be damped resulting in that the sound-absorbing structure according to the invention becomes relatively narrow.

The grooves can be shaped in many different ways, and as they do not have to act as Helmholtz resonators they need not have an aperture to the outside which compared with other groove sections is narrow. In an embodiment of the sound-absorbing structure according to the invention its section orthogonal to the grooves approximately forms a square wave. Thereby a very simple shape of the ribs is obtained, and the ribs may even be given a slightly inclined side, giving the possibility of moulding the ribs in a mould incorporating a slip (draft) if necessary.

In another embodiment of the sound-absorbing structure of the invention the section of the structure orthogonal to the grooves and the ribs approximately forms a sine curve. A fashioning of this kind invites to manufacture the surface by bending a plane sheet, which for instance is depressed in the underlying ground, but it also permits a manufacture by extrusion or casting.

In still another embodiment of the sound-absorbing structure of the invention the depth and the width of the grooves and the width of the ribs all increase as a function of the distance along the structure orthogonal to the longitudinal direction of the grooves and in the direction of propagation of the sound waves. Thereby is obtained that the sound attenuation for a given width of the structure is taking place on a wide frequency range.

If it is desired to carry out the damping for a frequency range broader than what a single structure can bring about then more structures, each adapted to different frequency ranges, can be provided in succession in the direction of propagation of the sound waves. However, instead of that it is possible, according to the invention, to superpose in the same position two or more of such succeeding structures which is obtained in that way that the section of the grooves is formed by superposing two or more systems of grooves each system having the grooves spaced differently or having different groove-depths or both in combination. However, a superposition of the structure is only approximately correct.

In an embodiment of the sound-absorbing structure of the invention, grooves having varying groove-depths and having in the varying grooves sound-absorbing material of the same kind may be replaced by grooves having equal depths, but having sound-absorbing material, the velocity of sound of which differs from one groove to another in such manner that the phase shift in each groove remains unchanged. Thereby is obtained that the widely non-uniform bottom contours in a structure of varying groove-depths are appreciably simplified to a structure of a constant groove-depth filled with sound-absorbing material having varying velocities of sound.

Further, it has appeared that the coupling between the sound to be damped and the local sound field, which is struck between two adjoining grooves, is very favourable to the maintenance of the local sound field even if it is damped by the damping material in the grooves. It is obvious, however, that if the sound attenuation depends on porous material in the grooves it will be difficult to prevent that the damping is adversely affected by e.g., fall of rain or snow, and it will be difficult entirely to prevent that the fall of rain or snow can penetrate into sound-absorbing material, which has been provided in the grooves.

To obviate this disadvantage the present invention provides a structure of the above mentioned kind, in which structure is included in or at the bottom of the grooves apertures, in the shape of holes or slots, which form an acoustical coupling joint, and which connect a groove to an adjoining one or to a cavity.

Because in the part of the sound spectrum, in which the structure is effective, the pressure at the bottom of the two adjoining grooves is in opposite phases substantially, an aperture connecting the bottoms of two adjoining grooves could result in currents involving a loss without the employment of moisture sensitive material.

If the aperture from the bottom of a groove leads to a cavity, this cavity could be provided in the ribs situated between two adjoining grooves. This offers the possibility of providing in the cavity a loss involving material protected against moisture.

According to the invention a cavity of this kind may be embodied as an acoustic resonator having a resonance frequency which possibly deviates from the resonance frequency of the coupling between two adjoining grooves and which, together with the acoustic coupling between two adjoining grooves, contributes to the achievement of a desired attenuation characteristic taking into consideration the frequency characteristic of the main source and the sensitivity curve of the human ear.

In an embodiment of the sound-absorbing structure of the invention the resonators coupled to the bottoms of the grooves are provided as cavities extending in a rib preferably longitudinally thereof, and the oscillations of the resonator are struck through the aperture or the apertures between the tubular cavity and the groove-bottom or the groove-bottoms. By this embodiment a moisture proof placement of the damping material is achieved as well as a substantial freedom in the selection of the resonance frequency of the acoustic resonators made in the tube. By this embodiment the resonance frequency of the resonator can be determined solely through the distance between successive apertures between the tube and the groove-bottoms, and the provision of material bottoms or partitions between resonators placed in an end-to-end relationship is possible but not necessary.

In a modified embodiment of the sound-absorbing structure of the invention the acoustic resonator coupled to the groove-bottom is designed as two, in the interior of the rib extending, inner grooves departed by an intermediate inner rib, and the oscillation of the resonator is struck through a slot along the bottom of the groove. This embodiment exhibits a double utilization of the principle of acoustic coupling between two adjoining grooves, the first one arising from the vigorous coupling to the free sound field above the structure and the second one from striking through the slot along the bottom by the sound field within the rib.

Also in this case it is possible to place sound-absorbing material in the cavity protected against moisture.

It has proven appropriate if the acoustically damping material placed in the acoustic resonators has been chosen in such a way, taking into account its acoustical absorption factor, placement and kind, that the acoustical resonances are attenuated without being deadened.

Figure 4:
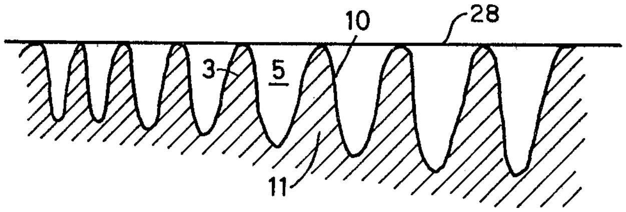
Figure 5A:
Figure 5B:
Figure 5C:
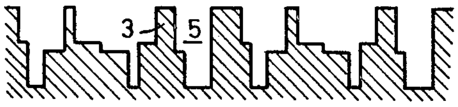
Figure 5D:
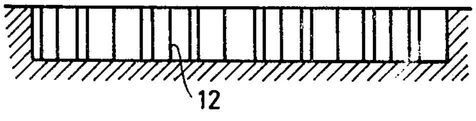
Figure 6:
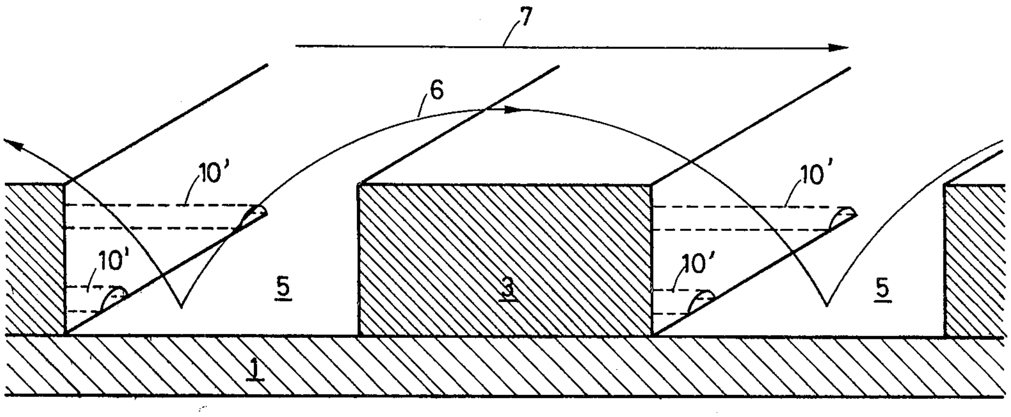
Figure 7:
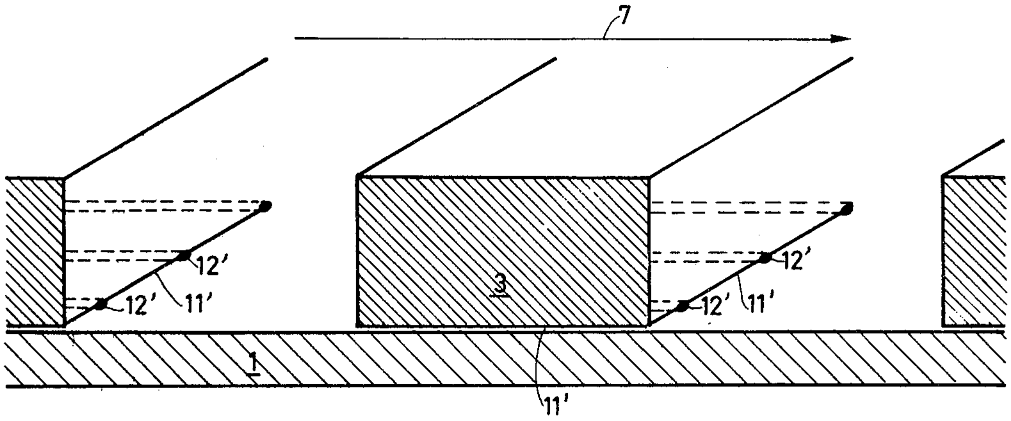
Figure 8:
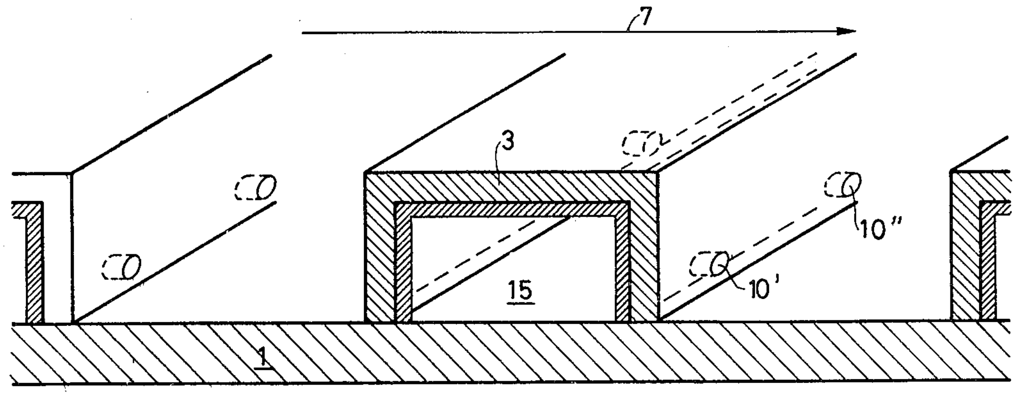
Figure 9:
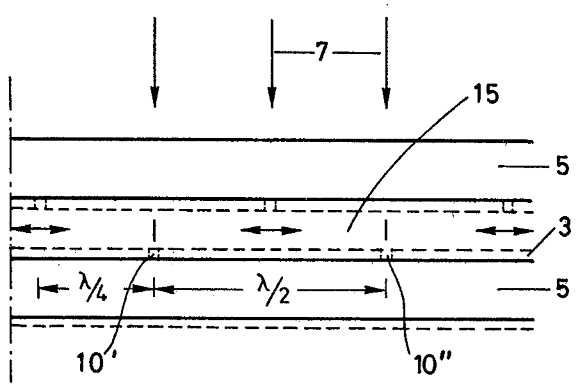
Figure 10:
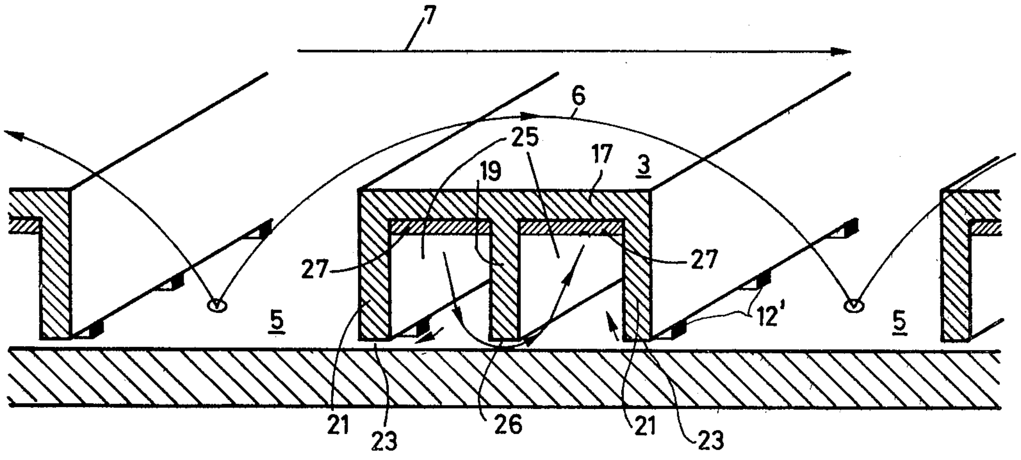

The invention will now be described in detail with reference to the accompanying drawings, in which FIGS. 1 through 4 are vertical sections of various embodiments of sound-absorbing structures according to the invention, FIGS. 5*a* through 5*d* are curves of section illustrating the superposition of curves forming two additional embodiments of sound-absorbing structures in accordance with the invention, FIGS. 6 through 8 are partly cross-sectional views and partly perspective views of three different embodiments of a sound-absorbing structure of the present invention, FIG. 9 is a top view of a segment of the embodiment of FIG. 8, and FIG. 10 is partly a cross-sectioned view and partly a perspective view of a further embodiment.

FIG. 1 illustrates a plane support in a depression in a field 2. The depression accomodates alternately turned, in section L-shaped beams which in a back-to-back configuration from ribs 3 and spacers 4, which provide bottoms in grooves 5. The conditions of materials for the ribs 3 are that they should be reasonably hard and weather-proof in the climate to which they are to be exposed. In the case that the sound wave loss factor of the employed material is too low, it is possible to provide some damping material 5 in the bottom of the grooves. The depression being provided with said structure must be drained off in a known manner to prevent that it is filled with water when it is raining. Its length correspond to the length of the area to be protected. If for instance the noise source is a motorway then the depression is placed along the motorway like a ditch, which may be interrupted periodically by means of cross-plates preventing the sound propagation longitudinally of the ditch just as far as it is desired to be damped. Sound originating from for instance a linear noise source of automobiles pass horizontally over the structure in the plane of the section, and results in stationary oscillations 6, the basic component of which has a nodal point at the bottom of the grooves 5. It will be appreciated that the curves 6 illustrated in FIG. 1 are meant to indicate a mean trace for the movement of particles in the stationary oscillations. The arrowheads of the traces illustrated above the ribs 3 are meant to designate antinodal points of the stationary oscillations. It should be noted that the arrowheads on adjoining curves are pointing in opposite directions and that they represent the situation for a particular phase of the stationary oscillations. A half period later all the arrowheads will be reversed. Further, one will note that systems of oscillation, which are positioned in a side-by-side relationship as the matter of a particular groove is concerned, move or dive into that particular groove but move up from or emerge simultaneously, on either side, in the adjoining grooves. An example, which has been gone over in an electronic computer, shows that the phase velocity of the entire acoustic field has the character of a "slow wave" and that its velocity of propagation is approximately 2.5 times slower than the phase velocity of a plane sound wave in free space having common pressure and temperature. For a given damping this "slow wave" phenomenon contributes to reduce the width of the structure, or in the case of a particular width of the structure, to increase correspondingly the attenuation and therefore is a significant practical advantage of the sound-absorbing structure of the invention.

As a material for the ribs and the spacers it could be desirable to choose that which is least expensive in the area in question. In some areas one could profitably choose to employ concrete and in other areas maybe fired earthenware, but the utilization of thin-walled structures of artificial materials such as plastics material could be profitable if for instance the expenditure for transportation to the deposition site plays a role.

It will be readily appreciated that irrespective of FIG. 1 showing a structure of alternately inversed L-shaped beams, the structure could, in accordance with the invention be provided by means of alternating high and low elements in such manner that the high elements form the ribs whereas the low elements form the bottom of the grooves herein between.

Figure 2:
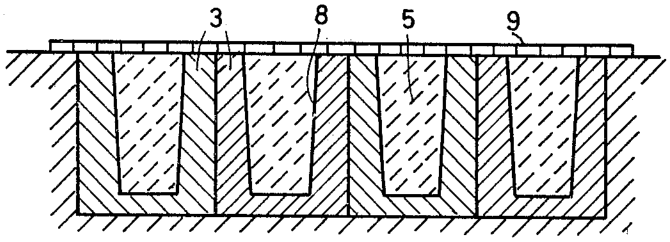

FIG. 2 illustrates a structure in which the L-shaped beams are replaced by U-shaped ones. The grooves 5 thereby provided are filled with sound-absorbing material. The loss factor of this material must neither be too large nor too small, because the fundamental vibrations of the system will be attenuated if the loss becomes too large resulting in an insufficient amount of power put into this system. This relationship is analogous to two mutually coupled electric circuits having an output load into which is put the largest possible power, when the output load has such a magnitude that the quality factor Q of the loaded circuit is the reciprocal value of the coefficient of coupling, i.e. at the critical coupling. Correspondingly for a particular structure and a particular frequency a loss factor of the material is existing giving an optimum absorption of sound energy per running meter of the structure. It is possible to find empirically a suitable loss factor by mixing materials having different loss factors. When many grooves are discussed it is possible to obtain a considerable attenuation even if the loss per groove must not modify very much the condition of oscillation in a single groove. The structure illustrated in FIG. 2 is further distinguished by the ribs 3 having non-parallel but slightly inclined side walls 8 which inter alia renders it possible to mould the ribs in integral forms, the sides of which thereby have a slip or incline, which results because of the draft incorporated in walls of a mold to permit removal of the molded item. Further it is shown that a grating 9 may be laid down over the ribs. The grating 9 can be provided by means of narrow bands or be provided as a wire netting and it should either permit passage across the structure or only prevent that coarse waste such as crumpled paper is blown down into the grooves.

Even if the FIGS. 1 and 2 illustrate structures laid down in a depression it will be understood that alternatively the structure can be placed on the top of a plane surface and even can be given the shape of a continuous mat to be laid down on said surface. Structures of this kind have the advantage of their drainage being simple.

By certain selections of parameters the product of attenuation per meter width of the structure and the width of the frequency band in which the attenuation occurs is nearly constant. If therefore a large attenuation is required one has to come to an arrangement with a small bandwidth. As it is desired to carry out a noise attenuation over a very broad frequency range it is appropriate to build a number of sections of structures having essentially in cascade serried attenuation intervals adapted to the prevailing frequency ranges of the noise sources and to the sensitivity curve of the human ear.

Figure 3:
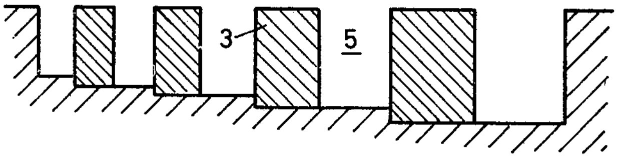

Instead of selecting a structure including section each having equal grooves and ribs, the size of which, however, increases from one section to another, it is as illustrated in FIG. 3 possible to choose a structure in which the width and depth of the groove and the width of the rib increase successively in the direction of propagation of the sound wave to be damped. More of such structures can be laid out one after another in the direction of propagation of the sound waves. FIG. 3 illustrates an embodiment in which the groove-depth increases like a stair-case and in which each step has a rib 3, which is larger than a preceeding one in such way that the surface remains plane.

The same plane surface is obtained by the embodiment of a sound-absorbing structure according to the invention illustrated in FIG. 4. By this embodiment the contour of the grooves and the ribs is sine-shaped with varying coefficients as the frequency and the amplitude of the curve increase in a direction along the section. Structures of this kind can be manufactured by depressing a corrugated plate or sheet 10 into a soft bed 11, or it can be manufactured from a corrugated sheet the one side of which is deposited with for instance concrete in order to provide a mat which can be laid out upon or into a field surface. The top openings of the grooves 5 between the ribs 3 can be covered by a film or foil of plastic material 28 illustrated by the horizontal line in FIG. 4.

As an alternative to these structures it will be possible to make a still more compact structure by superposing the varying sections of the frequency ranges as illustrated by way of example in FIG. 5*a*, 5*b* and 5*c* or 5*d* instead of placing these ranges in succession. In FIG. 5*a* is shown the contour of an imagined structure which attenuates in a predetermined frequency range, and in FIG. 5*b* a similar one is shown which attenuates in a contiguous frequency range. Based on an approximate theory it will now be possible to superpose these curves of section thereby providing the structure shown in FIG. 5*c*. This structure has been illustrated to such an extent that its periodicity can be seen. Further it will be appreciated that the shapes of the ribs and the grooves may be substantially irregular and in the case of such structure it can be appropriate to renounce a plane surface structure. This will especially be the case if one goes so far as to extend the superpositioning so that not only two but a very great number of or even an infinite number of structures, each having its own frequency range, are superposed. Superposition of an infinite number of frequency ranges can be carried out with a coarse approximation of the individual square wave curves valid for narrow frequency bands to sine-shaped curves, the linear dimensions of which vary inversely proportional to the frequency and which approximate coarsely the result with a new staircase-curve. In FIG. 5*d* is illustrated an embodiment of a sound-absorbing structure according to the invention, which structure has been derived from the structure shown in FIG. 5*c* by calculating the phase shift between the field surface and the bottom of a groove in a predetermined location and on the basis of this by calculating what the velocity of sound had to be at the location in question for a given constant groove-depth. The structure of FIG. 5*d* thereby achieves a flat bottom and an even surface, but for each change of the structure of FIG. 5*c* a permanent partition 12 is possibly inserted. Then the spaces between these partitions is filled out with appropriate blended materials having mutually different densities and in consequence thereof mutually different velocities of sound.

In FIG. 6 the numeral 1 again designates a plane support which may be laid out upon a field aside the noise source, the noise from which is to be absorbed. The support 1 may be depressed in a low ditch (trench) or it may be placed on the top of the field or even be raised a bit above the field, particularly taking into account the local drainage situation.

By means of curves 6 is given a hint of a mean particle path for a local sound field having half-wave resonance between two adjoining grooves the local sound field being generated by the noise sound field the direction of propagation of which across the structure is indicated by an arrow 7. The local sound field has antinodes in the air above the ribs 3 and nodes including large variations of pressure in the bottom of the grooves 5.

Thus the local sound field has substantially counter phase at the bottom of two adjoining grooves. The sound-absorption aimed at will take place partly because of unavoidable loss in the support 1 and partly because of friction of the air, but a substantially enlarged absorption can be obtained by the provision of damping material preferably in the bottom of the grooves 5. According to the present invention this is undesirable, however, because the fall of rain or snow or another kind of fouling, e.g. arising from drifting sand or earth, can damage the properties of the damping material.

If, according to the invention, apertures e.g., in the shape of holes 10' are provided, which apertures meet one groove with an adjoining one, then loss generating currents will be produced in these holes, and a hole will not to the same extent as porous damping material have its loss-giving properties damaged by moisture or fouling. The shape, dimension and number per unit of length of the apertures can be varied as required, and the apertures, as is illustrated in FIG. 7, can develop into a slot 11', which is provided by placing the ribs 3 upon low spacers (or blocks) 12'. The loss will to a considerable degree be inherent in the friction between the air and the walls of the apertures. Therefore, the ratio of the sectional area of the apertures and their circumference has to be chosen appropriately.

In FIGS. 8 and 9 is illustrated an embodiment of a sound-absorbing structure, in which the apertures 10' lead to a cavity 15 in the interior of the rib 3. In this embodiment the walls of the cavity or suitable parts of these can be lined with porous damping material without a substantial risk of having the damping properties of this material being undesirably influenced by moisture or fouling. In cavities 15 resonance can preferably be established either at the same frequency as or at other frequencies than the resonance frequency of the exterior acoustic coupling between adjoining grooves 5. The distance between neighbouring holes 10' and 10'' will determine the longitudinal resonance in the cavity 15 will as far as the basic oscillation is concerned correspond to a half wave-length. The cavities 15 may either have apertures in only one side of the rib, or apertures may be provided in both sides of the rib. In the last mentioned case it must be taken into account, that a counter phase is excisting between the oscillations in adjoining grooves, which is the reason why the apertures in opposite sides of a rib 3 have to be off-set relative to each other. If desirable it is possible to establish particular resonance frequencies by the insertion of partitions in the cavity of the rib just as it is possible to insert loss-giving material of any kind, e.g. in the form of short walls of netting or gauze.

It is a general opinion, that the most disturbing frequency range of the noise originating from motorways is around 300 Hz. Therefore, it will be suitable to provide at least a part of the structure with an acoustic coupling having resonance 6 between adjoining grooves slightly above this frequency. In the embodiment illustrated in the FIGS. 8 and 9 it will conveniently be possible to increase the attenuation range towards lower frequencies by adapting the distance between adjacent apertures 10' and 10'' to be as large as to establish, at for instance approximately 200 Hz, a half wave resonance in the interior of the rib 3 and longitudinally thereof. It will be understood that it will be possible to let the distance between adjacent apertures 10' and 10" vary from one rib to another in order to gain an improved characteristic of the sound absorption likewise as it is possible to establish an attenuation at frequencies above 300 Hz.

In FIG. 10 is illustrated a modified embodiment of a sound-absorbing structure according to the invention. This embodiment has like the embodiments described above ribs 3, grooves 5 between the ribs and a cavity in the interior of each rib 3. However, the resonance in the cavity is established in a different manner.

The middle of the "ceiling" 17 of the rib 3 is here provided with an inner rib 19 thus providing interior grooves 25 between the walls 21 of the rib and the inner rib 19. The walls 21 are not supported directly by the base but are standing on low spacers (or blocks) 12' thereby creating slots 23 under the walls 21. The inner rib 19 does not reach the base either so that an inner slot 26 is provided too under the inner rib 19.

The counter phase pressure between adjacent grooves will, through the slots 23, strike a half wave resonance between the inner grooves 25 under the inner rib 19 in a similar way as the outer sound field, having the direction of propagation which is indicated by way of an arrow 7, strikes a local sound field having half wave resonance between adjacent grooves 5. Because of the damping effect of the slots 23 and 26 respectively it is not absolutely necessary to provide the inner grooves 25 with damping material, but if it is desired to obtain a further damping in the frequency range of the inner half wave resonance it would be possible to place further damping material 27 under cover of the "ceiling" 17 of the rib 3 and its walls 21, which material then would be well protected against moisture and fouling.

Generally it applies to sound-absorbing structures of the kind referred to above that if the structure was infinitely broad then it would have a frequency characteristic, which would exhibit for an increasing frequency an attenuation, which increases towards a range of blocking frequencies. Above this blocking range there would be a new passing range having an attenuation, increasing towards a new, in terms of frequencies, higher range of blocking frequencies, etc. These properties can be derived from an analogy to the theory of electromagnetic fields. In practise, however, the structures are not infinitely broad, and the consequence of that is that the real structure having a finite broadness in the blocking ranges will cause reflections, which are more or less pronounced. Then, this is not a matter of an attenuation solely caused by an effect which corresponds to the effect of a Helmholtz resonator. These circumstances have to be taken into account by the final dimensioning of structures of the kind referred to. Thus, if great importance is attached to attenuation of frequencies in the range about 300 Hz one should select the resonance frequency of the outer acoustic coupling between adjacent grooves somewhat higher than said frequency, e.g. close to 450 Hz. If further importance is attached to attenuation of even lower frequencies, e.g. towards 200 Hz, it is possible to create a further resonance in the cavity 15 in the interior of the rib 3 close to the last mentioned frequency.

The application of damping structures according to the invention is not limited to damping of noise from airports and motorways, but the said structure can damp any sound propagating along à surface. Hence structures according to the invention can be utilized to attentuate sound which propagates in a longitudinal directon in underground passages or in pipelines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A sound-absorbing structure for use adjacent a surface such as a surface of the soil or ground around roadways and airports comprising: material with a plurality of linear and parallel, spaced apart upstanding ribs with grooves between said ribs for damping a first sound field passing across said surface, characterized by the depth and width of the grooves and the height and thickness of the ribs being so dimensioned, and by the sound-absorbing structure being arranged substantially parallel to and the longitudinal direction of the ribs and grooves substantially orthogonal to the direction in which a sound attenuation is desired, that there is provided an acoustic coupling between adjacent grooves of the structure at the frequencies to be damped causing the generation of a local sound field, which is a system of stationary fluctuations from one groove to another acquiring its energy from said first sound field passing across said structure.

2. A sound-absorbing structure as claimed in claim 1, characterized in that said grooves are filled with air, that the bottom and the walls of said grooves are sound-absorbing and that the aperture of each said groove between said ribs is covered by a film of a plastics material.

3. A sound-absorbing structure as claimed in claim 1, characterized in that said grooves contain sound-absorbing material and that the bottom and side walls of the grooves are sound reflecting without loss.

4. A sound-absorbing structure as claimed on claim 1, 2 or 3, characterized in that its section orthogonal to the grooves and the ribs approximately forms a square wave.

5. A sound-absorbing structure as claimed in claim 1, 2 or 3, characterized in that its section orthogonal to the grooves and the ribs approximately forms a sine curve.

6. A sound-absorbing structure as claimed in claim 1, 2 or 3 characterized in that the depth and the width of the grooves and the width of the ribs all increase as a function of the distance along the structure normal to the longitudinal direction of the grooves and in the direction of propagation of the sound waves.

7. A sound-absorbing structure as claimed in claim 1, 2, or 3, characterized in that the section of said structure is provided by superimposing two or more groove-systems selected from a plurality of groove systems, some of which have the grooves structure encompassing a spaced differently and some of which have different groove-depths.

8. A sound-absorbing structure as claimed in claim 1, 2 or 3 characterized in that said grooves have equal depths and include sound-absorbing material, the velocity of sound of which differs from one groove to another in such manner that the phase shift in each groove remains unchanged.

9. A sound-absorbing structure as claimed in claim 1, 2 or 3, characterized by an open network structure covering at least the apertures of the grooves.

10. A sound-absorbing structure as claimed in claim 1, 2 or 3 characterized in that apertures are provided adjacent the bottom of the grooves, which apertures constitute an acoustic coupling joint which connect a groove to an adjacent structure encompassing a space.

11. A sound-absorbing structure as claimed in claim 10, characterized in that said adjacent space is a cavity (15) provided in the ribs (3), positioned between two adjacent adjoining grooves (5).

12. A sound-absorbing structure as claimed in claim 10, characterized in that said space is an acoustic resonator having a resonance frequency, which may differ from the resonance frequency of the coupling between two adjacent grooves (5) and which together with the acoustic coupling between adjacent grooves contributes to the achievement of a required attenuation characteristic.

13. A sound-absorbing structure as claimed in claim 12, characterized in that the acoustic resonators coupled to the grooves (5) are a cavity extending logitudinally within a rib (3), and in that the oscillations of the resonator are struck through the apertures between the cavity and the groove-bottoms.

14. A sound-absorbing structure as claimed in claim 12, characterized in that the acoustic resonators coupled to the grooves (5) are, in the interior of the rib (3), two extending, inner grooves (25) having an intermediate inner rib (19) therebetween, and in that the frequency of the resonator being struck through slots (23) underneath the sidewalls (21) of the first named rib.

15. A sound-absorbing structure as claimed in claim 12, characterized in that the acoustic attenuating material provided in the acoustic resonators is selected so, that, taking into account the acoustical attenuation factor, position and kind, the acoustic resonances are attenuated without being eliminated.

* * * * *

UNITED STATES PATENT AND TRADEMARK OFFICE

CERTIFICATE OF CORRECTION

PATENT NO. : 4,244,439

DATED : January 13, 1981

INVENTOR(S) : Jens Wested

It is certified that error appears in the above-identified patent and that said Letters Patent are hereby corrected as shown below:

Column 2, line 29, change "structrue" to --structure--.

Column 5, line 5, after "support" insert --1--.

Column 10, line 43, change "on" to --in--.

Column 10, line 60, cancel "structure encompassing a".

Signed and Sealed this

*Twenty-third* Day of *June 1981*

[SEAL]

*Attest:*

RENE D. TEGTMEYER

*Attesting Officer* *Acting Commissioner of Patents and Trademarks*